J. V. WASHBURNE.
ROTARY CUTTER FOR ENVELOP OPENERS.
APPLICATION FILED JULY 19, 1917.
1,300,792.
Patented Apr. 15, 1919.
2 SHEETS—SHEET 1.
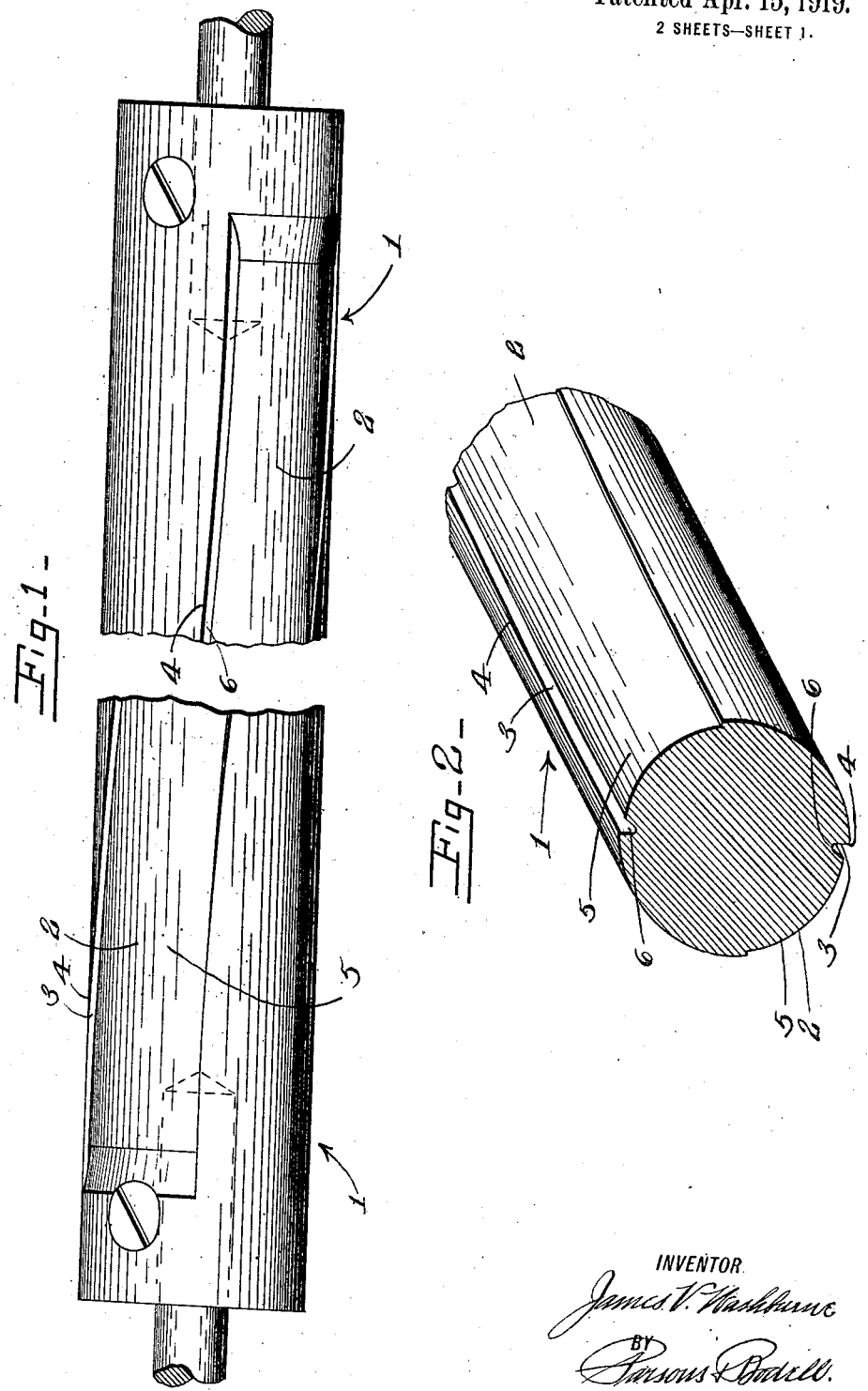
INVENTOR.
James V. Washburne
BY
Parsons & Bodell.
ATTORNEYS

UNITED STATES PATENT OFFICE.

JAMES V. WASHBURNE, OF FULTON, NEW YORK.

ROTARY CUTTER FOR ENVELOP-OPENERS.

1,300,792.  Specification of Letters Patent.  Patented Apr. 15, 1919.

Application filed July 19, 1917. Serial No. 181,587.

*To all whom it may concern:*

Be it known that I, JAMES V. WASHBURNE, a citizen of the United States, and a resident of Fulton, in the county of Oswego and State of New York, have invented a certain new and useful Rotary Cutter for Envelop-Openers, of which the following is a specification.

My invention has for its object the production of a rotary cutter particularly applicable for envelop openers such as that described in Patent No. 1,005,879, October 17, 1911, of which I am the owner, and, in my Patent No. 1,265,844, issued May 14, 1918, which cutter is so constructed that it can be readily sharpened; and the invention consists in the novel features hereinafter described and claimed.

In describing this invention, reference is had to the accompanying drawing, in which like characters designate corresponding parts in all the views.

Figure 1 is an enlarged elevation, partly broken away, of a rotary cylinder cutter embodying my invention.

Fig. 2 is an isometric view of a fragmentary portion of the cutter on an enlarged scale.

Figure 3:
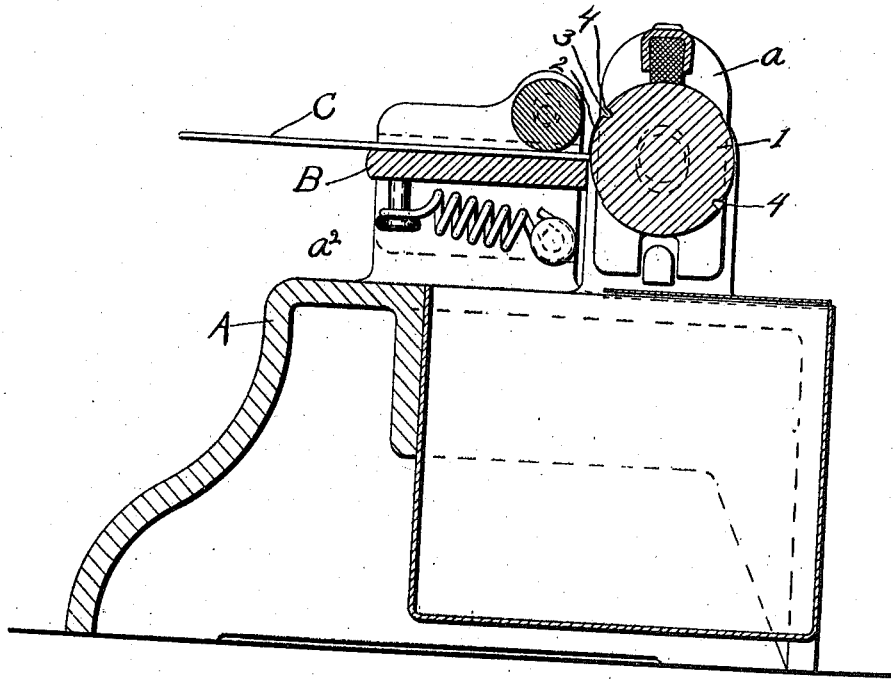
Fig. 3 is a transverse sectional view through a machine embodying my invention.

1 designates the cylinder which is provided with a lengthwise spiral groove 2 forming a cutting edge at one side 3 of the groove as at 4, the bottom of the groove at the base of the side 3 being removed to form a clearance for the clipping and for a sharpening tool or grinder which engages the side 3 of the groove and takes off a minute portion thereof sufficient to sharpen the edge 4.

In Fig. 3 the cutter or cylinder 1 is shown as mounted in operative position in a machine such as shown in my patent referred to. A designates the base of the machine having upright standards as the standard *a* which supports the cylinder 1 and also having means as uprights $a^2$ which carry a shear plate B arranged substantially radially relatively to the cutter and designed to support an envelop or other sheet C to be operated upon by the cutter.

The groove 2 is shallow and broad enough to receive a long envelop therein with its extreme advance margin exposed to the spiral cutting edge 4, and its edge against the bottom 5 of the groove 2, which bottom is convex and here shown as substantially concentric with the arc of the periphery and which acts as a stop for the envelop so that but a small strip at the margin will be sheared off when the cutter is operated either by hand or by power.

The cutting side 3 is preferably radially disposed, as in the patent referred to, and as here shown, the groove 2 is deepened contiguous to said cutting side 3 by forming a channel 6 along the base of the cutting side, one side of the channel forming a continuation of the cutting side of the groove 2.

It is impractical to sharpen the cutting edge of the cutter of the Patent No. 1,005,879 and of my patent referred to, as grinding of the periphery of the cutter destroys the cutting edge and the cutting side of the groove is too shallow to permit the operation of grinding or sharpening tools along said cutting edge.

By forming the cutter with the groove having a channel along the base of the cutting side thereof, the cutting edge can be sharpened by the use of a tool movable along only the cutting side. The cutter can be sharpened at small expense an indefinite number of times without injury thereto, and without impairing its usefulness.

It is preferable in some instances to form the cutter with a plurality of grooves 2 as shown.

In the operation of a machine embodying my cutter, the envelop is placed in the machine with the advance edge thereof abutting against the bottom 5 of the groove 2, which bottom 5 acts as a stop to prevent further movement of the envelop toward the cutter as shown in Fig. 3. The cutter is then rotated bringing the cutting edge into engagement with the margin of the envelop and, in coöperation with the shear plate or anvil of the machine of said Patent 1,005,879 and said Patent 1,265,844, shearing off a slight clipping at the edge of the envelop, the depth of the groove 2 being approximately 12/1000 inches and determining the amount sheared off, this amount not being enough to let the cutting edge reach the contents of the envelop.

In addition to permitting sharpening of the cutting edge, the channel 6 forms a clearance for the clipping and hence the liability of the clipping wedging or adhering to the cutter and being carried around with the cutter, as in the cutter of said patent and application, is overcome.

What I claim is:—

1. A cutter for envelop openers comprising a rotary cylinder having a spiral groove in the periphery thereof, the groove having its bottom convex and depressed slightly below the periphery of the cylinder, one side of the groove forming a cutting edge, the cylinder being formed with a channel in the bottom of the groove at the base of the cutting side of the groove, substantially as and for the purpose described.

2. A cutter for envelop openers comprising a rotary cylinder having a spiral groove in the periphery thereof, the groove having its bottom convex and depressed slightly below the arc of the periphery of the cylinder, one side of the groove forming a cutting edge, the cylinder being formed with a channel in the bottom of the groove and at the base of the cutting side of the groove, one side of the channel forming a continuation of said cutting side of the groove, substantially as and for the purpose specified.

3. A cutter for envelop openers comprising a rotary cylinder having a lengthwise peripheral spiral groove, the groove having its bottom convex and depressed slightly below the arc of the periphery of the cylinder, one side of the groove forming a knife edge, the cylinder being formed with a channel in the bottom of the groove along the cutting side thereof, one wall of the channel forming a continuation of the cutting side of the groove, substantially as and for the purpose set forth.

4. A cutter for envelop openers comprising a rotary cylinder provided with a lengthwise spiral peripheral groove, the groove having its bottom convex and depressed slightly below the arc of the periphery of the cylinder, one side of which forms a knife edge, the cutting side of said groove being radially disposed, the cylinder being formed with a channel extending along the base of the cutting side of the groove, one side of the channel being radially disposed and forming a continuation of the radial side of the groove, substantially as and for the purpose specified.

5. A cutter for envelop openers comprising a rotary cylinder provided with a lengthwise spiral peripheral groove, one side of which forms a knife edge, the bottom of the groove being concentric and depressed slightly below the periphery of the cylinder, the groove being deepened along the base of the cutting side of the groove, substantially as and for the purpose set forth.

6. A cutter for envelop openers comprising a rotary cylinder provided with a lengthwise peripheral groove forming a knife edge at one side of the groove, the bottom of the groove being substantially concentric with the axis of the cylinder, the cutting side of the groove being deeper than the opposite side thereof providing a clearance for a sharpening tool, substantially as and for the purpose described.

7. A cutter for envelop openers comprising a rotary cylinder having a lengthwise peripheral spiral groove forming a knife edge at one side of the groove, the bottom of the groove being convex and the portion of the bottom of the groove contiguous to the cutting side thereof being removed to form a clearance for receiving a sharpening tool for the cutting edge, substantially as and for the purpose specified.

In testimony whereof, I have hereunto signed my name at Syracuse, in the county of Onondaga, and State of New York, this 5th day of July, 1917.

JAMES V. WASHBURNE.

Copies of this patent may be obtained for five cents each, by addressing the "Commissioner of Patents, Washington, D. C."